United States Patent [19]

Grant et al.

[11] Patent Number: 4,697,324

[45] Date of Patent: Oct. 6, 1987

[54] FILAMENTARY STRUCTURAL MODULE FOR COMPOSITES

[75] Inventors: William F. Grant, Londonderry, N.H.; Gary W. Burt, Methuen; Albert J. Kumnick, Acton, both of Mass.

[73] Assignee: Avco Corporation, Lowell, Mass.

[21] Appl. No.: 678,847

[22] Filed: Dec. 6, 1984

[51] Int. Cl.⁴ ............... B23K 20/22; B32B 15/14
[52] U.S. Cl. .................... 29/419 R; 228/190; 428/37; 428/65; 428/608
[58] Field of Search ............ 428/37, 64, 65, 608, 428/614; 156/169, 252, 293; 228/190, 170, 193; 29/419 R

[56] References Cited

U.S. PATENT DOCUMENTS

| | | | |
|---|---|---|---|
| 3,260,398 | 7/1966 | Levenetz | 156/293 X |
| 3,639,197 | 2/1972 | Spain | 428/37 |
| 3,859,160 | 1/1975 | Marin | 428/37 |
| 3,991,928 | 11/1976 | Friedrich et al. | 228/190 |
| 4,010,884 | 3/1977 | Rothman | 228/190 |
| 4,098,142 | 7/1978 | Weyler | 428/65 |
| 4,110,505 | 8/1978 | Prewo | 428/114 |
| 4,455,334 | 6/1984 | Ogino et al. | 428/37 X |

Primary Examiner—Kenneth J. Ramsey
Attorney, Agent, or Firm—Abraham Ogman

[57] ABSTRACT

This invention includes a continuous in-plane spiral of monofilament/metallic ribbon which forms a preform for metal matrix composite fabrication. The purpose is to provide continuous spiral filament reinforcement around a hole or central core. This spiral monolayer is fabricated by co-winding the filament and a ribbon or wire made from the intended composite material around a mandrel. Monolayers so constructed could then be stacked to form cylindrical or torus-shaped components and consolidated in a direction parallel to the axis of the shape.

12 Claims, 11 Drawing Figures

Fig.1A.
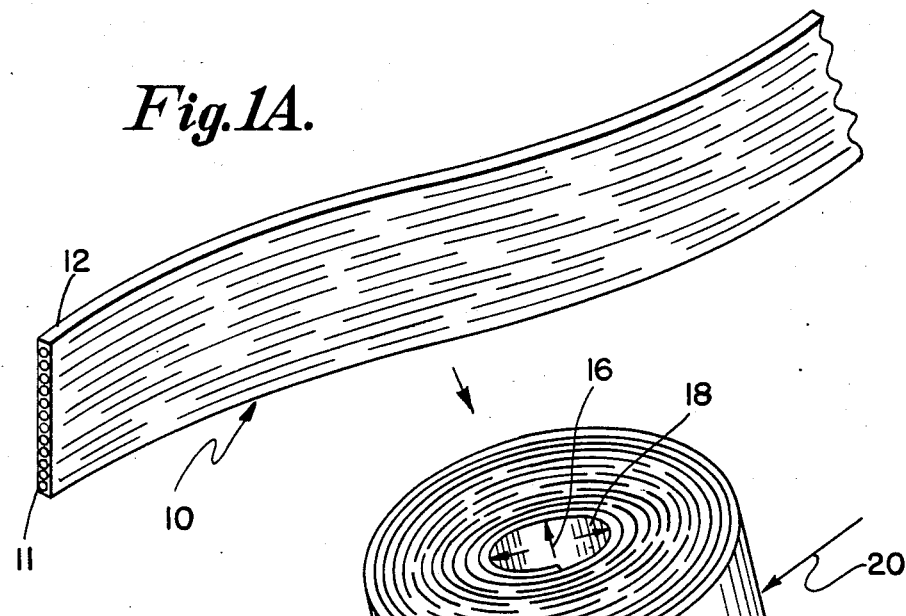
Fig.1B.
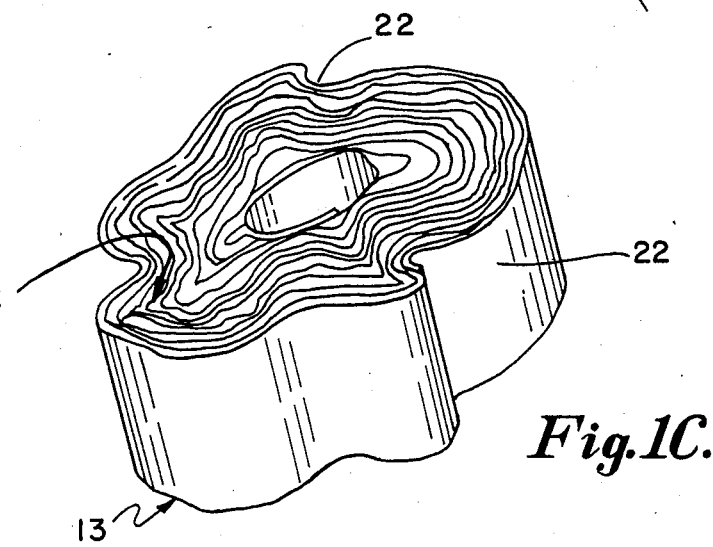
Fig.1C.

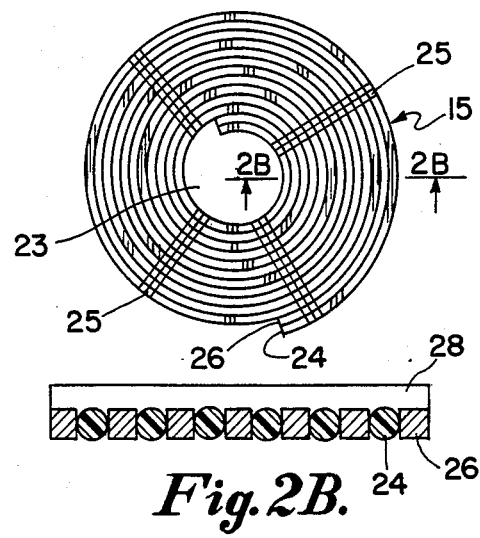
Fig.2A.
Fig.2B.
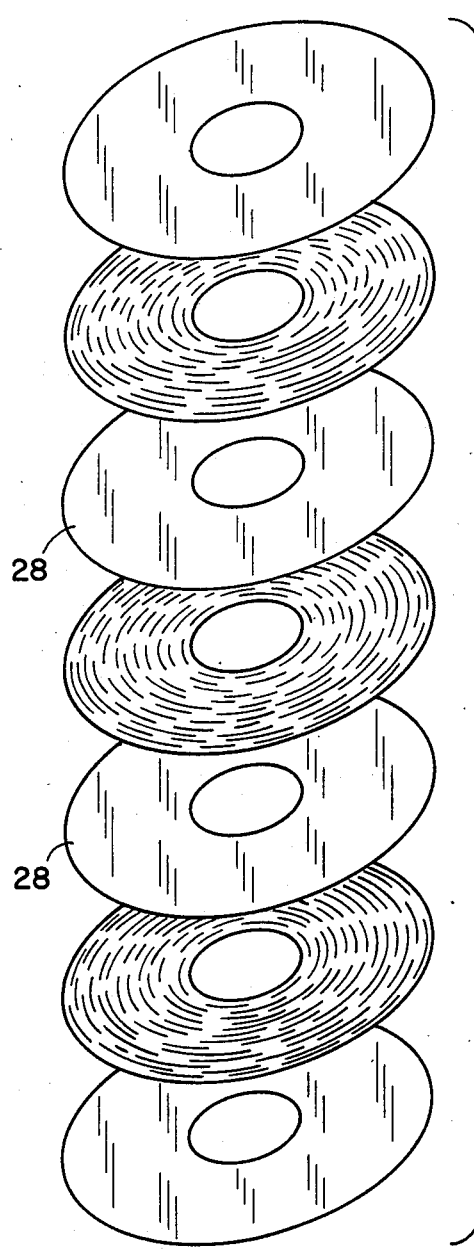
Fig.2C.

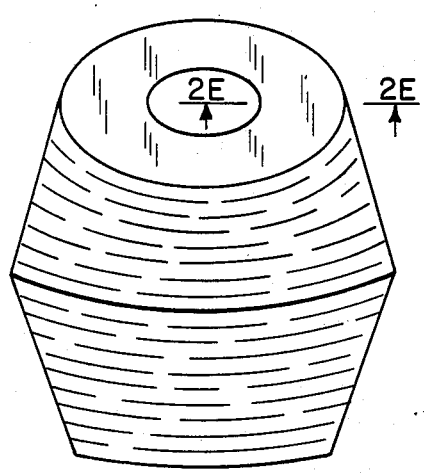
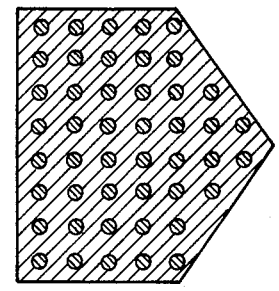
Fig.2D.
Fig.2E.

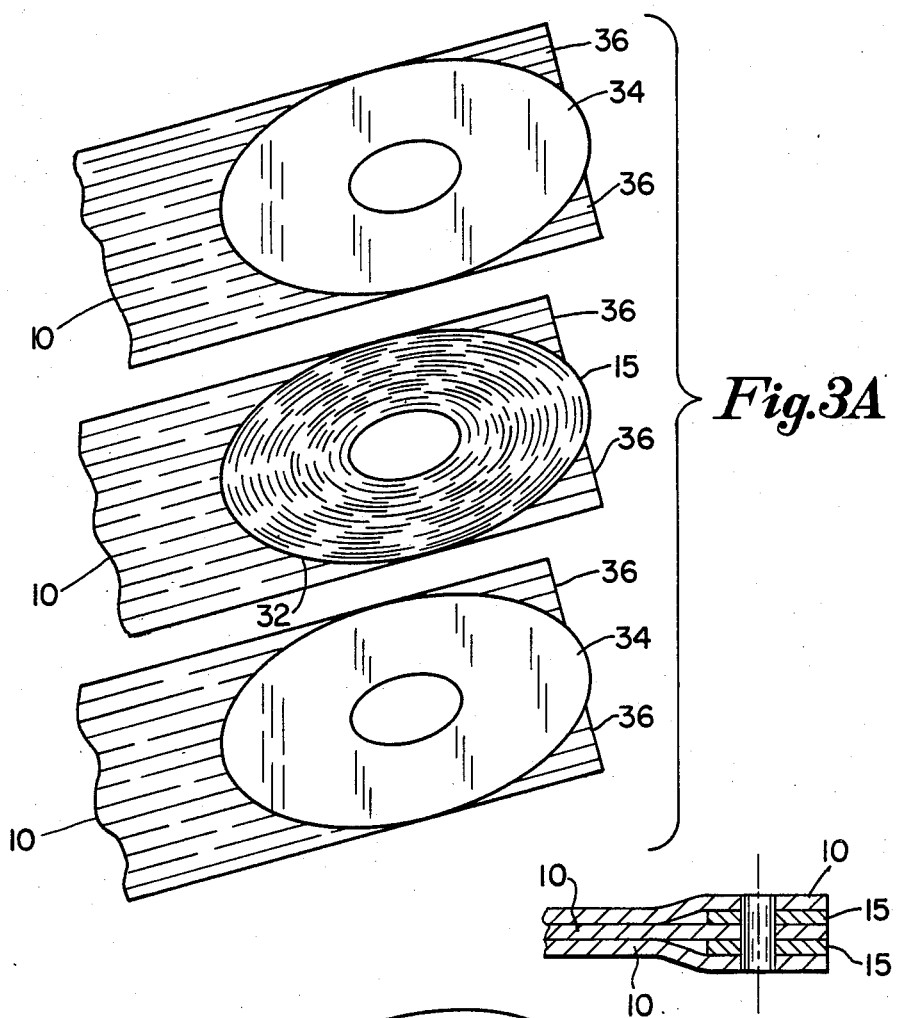
Fig.3A
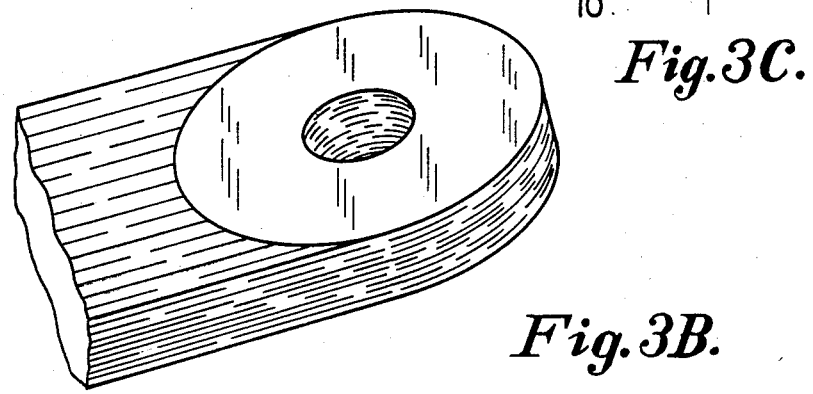
Fig.3C.
Fig.3B.

FILAMENTARY STRUCTURAL MODULE FOR COMPOSITES

BACKGROUND OF THE INVENTION

The invention is directed to filamentary reinforced composite rings and methods of making these rings.

The present method of making reinforced rings e.g., torus-shaped or doughnut-shaped, is to first make a unidirectional monolayer strip or tape having a width equal to the maximum height of the desired rings. The strip is rolled into a ring having a desired inside and outside diameter. The thus-formed ring is then consolidated using either internal or external radial pressure, that is, pressure normal to the strip surface. Lug reinforcements have been made by a method similar to the method used to make these rings. Unless the strip or tape is continuous, there is no filament continuity across the thickness of the ring.

Localized circular reinforcement of attachment holes are not and cannot be made by rolling strips into rings. Typically, these localized circular reinforcements are made by cross-plying (0°,±45°) the unidirectional laminate. Another way of making a ring having a rectangular cross-section would be to wind a plurality of layers of filaments on a mandrel where each layer is separated by a sheet of matrix material. The winding progresses until the desired thickness is achieved. The winding is then removed from the mandrel and consolidated.

Applicants know of no prior art patents or articles which are closely relevant to the process and structure embodied in the present invention. However, several prior art forms that may be useful to form rings or toruses are described in U. S. Pat. Nos. 3,427,185; 3,575,783; 3,900,150; 3,984,043; and 3,991,928.

OBJECTS OF THE INVENTION

An object of this invention is to provide a process for making filamentary reinforcement rings in which the filamentary reinforcement is continuous across the thickness of the ring.

Another object of the invention is to provide a filamentary reinforced structural module for making composite rings.

Yet another object of the invention is to provide a process for making filamentary reinforced composites from monolayers of continuous filamentary wound reinforcements.

Yet another object of the invention is to provide a process for making a filamentary reinforced composite ring whereby said ring, when constructed, avoids being distorted during the consolidation phase of the process.

Yet another object of the invention is to provide a filamentary reinforced module which can be used in combination with plies of unidirectional strips for localized circular reinforcement.

SUMMARY OF THE INVENTION

In accordance with the invention, the filamentary reinforced module comprises a monolayer of a continuous reinforced filament in combination with a ribbon formed from the intended matrix wound in a planar circular spiral or noncircular spiral, such as an oval or ellipse, about an aperture or hole. Adjacent filaments of said spiral are attached at least locally to each other to prevent the spiral from unwinding. The structural module may include, in addition, additional matrix material coating one or both faces of the module. A filamentary reinforced composite structure is made by stacking modules to a desired thickness or by interleaving such modules with unidirectional tape and consolidating such combinations.

The invention, together with further objects and advantages, will be best understood by reference to the following detailed description when taken in conjunction with the accompanying drawings.

DESCRIPTION OF THE DRAWINGS

FIG. 1A shows a strip of unidirectional filamentary reinforced monolayer;

FIG. 1B shows the FIG. 1A strip wound into a ring;

FIG. 1C is a highly-exaggerated representation of the FIG. 1B ring after radial consolidation;

FIG. 2A depicts the basic structural module;

FIG. 2B is a section taken along lines 2B—2B of FIG. 2A;

FIG. 2C shows modules being stacked;

FIG. 2D shows the direction of consolidation of a stack of modules to form a ring;

FIG. 2E shows a fully-consolidated FIG. 2D section;

FIG. 3A is an exploded view of the use of the module to make a lug; and

FIG. 3B is the completed lug.

FIG. 3C shows another lug construction comprising the modules intermposed between layers of unidirectional filaments.

DESCRIPTION OF THE PREFERRED EMBODIMENT

Referring to FIG. 1A, there is shown a conventional strip 10 comprising a monolayer of unidirectional filaments 11 embedded within a matrix material 12. In order to construct a ring and in particular a ring having a rectangular cross-section, the strip 10 is wound peripherally on a mandrel (not shown) into a coil 13 shown in FIG. 1B. In this construction, the filaments are aligned orthogonally to the axis 14 of the coil 13. The arrows 16 indicate that the coil 13 may be consolidated by inserting a radial pressure on the inside surface 18 of the coil 13. Arrows 20 indicate alternatively that the coil 13 may be consolidated by exerting a radial pressure on the outside surface.

The disadvantage to using strip monolayer is primarily with the consolidation direction. Consolidation in the radial direction when initiated on the I.D. surface (arrows 16) places the filament under high tensile stress resulting in filament breakage and, therefore, the loss of structural integrity.

When radial pressure is applied from the O.D. surface (arrows 20), buckling occurs such as at 22. Buckling is accompanied by filament breakage and distortion of the circular path of the fibers, both of which reduce the structural integrity.

A additional disadvantage to the strip monolayer approach is that only a right circular shape, that is, a shape having a rectangular cross-section, can be consolidated. If a torus or other non-rectangular cross-section is desired, extensive secondary machining must be performed. When this type of machining is done, the machine surfaces have exposed a very large percentage of filament cross-sections. This situation is detrimental to the subsequent diffusion bonding into a structure due to excessive formation of brittle reaction products.

Referring to FIG. 2A, there is shown a basic structural module 15 embodying the present invention. The module consists of co-winding of a filamentary reinforcement 24 and a metal strip 26. See FIG. 2B also. The winding comprises a spiral in a planar configuration or planar winding. Note that while a circular hole and spiral are shown, the technique can be used with other configurations such as ovals and ellipses. A plurality of basic structural modules 15 are generally stacked up to construct a composite ring.

Finally, the invention is directed to the process for making both the basic structural module, as well as the fully consolidated composite structures.

Such spiral monolayers are fabricated by cowinding filament 24 and ribbon 26 of the desired matrix alloy having a thickness that will provide the proper filament-to-filament spacing to achieve target filament volume fraction. The co-winding is wound around the mandrel having a diameter slightly smaller than the desired winding internal diameter of the ring.

Preferably, this mandrel is located at the center between two flat, circular platens having a spacing sufficient to maintain a monolayer in a planar spiral array. The filament 24 and ribbon 26 are wetted either before or after the spiral array is completed with a fugitive binder 25 such as acrylic to prevent the spiral from unwrapping when released from the mandrel. In this form, the module is said to be a "green" module or preform.

At this point, the green module can be placed between one or two circular foils 28 (see FIGS. 2B and 2C) of the appropriate matrix material. The green preforms are then stacked, one on top of another as shown in FIG. 2C to a desired thickness and consolidated by means of heat and pressure to form a ring-shaped composite member. Preforms of different diameters can be used to form cross-sectional shapes other than rectangular. Such non-rectangular shape is shown in FIGS. 2D and 2E.

Consolidation takes place along the axis of the preforms in a direction perpendicular to the plane of the spiral (see arrows 30). Under these conditions, there is no chance of buckling or filament fracture, and the shape concentricity is easily maintained.

Alternatively, the co-winding ribbon may be wound around a conical mandrel. The conical winding thus made can than be collapsed into a flat, planar structure when the mandrel is removed. This alternative can result in poor filament alignment, however.

The configuration illustrated in FIGS. 2D and 2E was chosen to illustrate that the basic module lends itself to making rings that do not have rectangular cross-sections. The dimensions of each module 15 are chosen to correspond with its intended position in the buildup of the ring.

The filaments may be any type of reinforcement filament such as carbon, boron, silicon carbide, silicon nitride, alumina, graphite, etc. Alternatively, combinations or derivatives of these filaments may be used. For example, a boron filament coated with $B_4C$ or a silicon carbide filament containing coatings or surface treatments of other materials such as a carbon-rich silicon carbide layer or a silicon layer would be considered a derivative filament. Very often, the filaments such as boron and silicon carbide, etc. are plated for specific properties, and these derivative filaments are also useful.

The invention has its principal applicability with the use of filaments having a high bending modulus or very high stiffness, e.g., a tensile strength in excess of 350 thousand psi and a tensile modulus in excess of 30 million psi. In each case, such stiff filaments have a minimum bending radius which, in effect, will determine the diameter of the aperture or hole 23, or in the case of a non-circular hole such as an oval hole, the minimum radius of the curved surfaces. There does not appear to be any limit on the radial buildup of the spiral.

The invention has its principal application in metal matrix structures using such matrix materials as aluminum, titanium, magnesium, copper, etc. However, the structure can obviously be used with a resin matrix such as an epoxy matrix or polyimide matrix material.

FIGS. 3A–3C illustrate two ways of making a fastening lug using the basic structural module 15. Referring to FIG. 3A, there is shown in the center a unidirectional monolayer 10 of composite material. Basic structural module 15 is positioned within a hole 32 made within the unidirectional monolayer 10. Above and below the structure just defined are other monolayers 10 having unidirectional filaments. Each of these monolayers has positioned in co-axial alignment with the basic structural module 15 a sheet of foil 34 configured to be co-extensive with the basic structural module 15. There is shown in FIG. 3A a plurality of tabs 36 which are removed from the various monolayers 10 before the buildup is consolidated.

The finished lug is constructed by consolidating the buildup, monolayers, foils, and basic structural module along the axis in the manner previously described. Consolidation is performed by applying sufficient heat and pressure to enable or force the diffusion bonding of the matrix material contained in the foil 34 in the co-winding of the basic structural module 15 and the matrix material of the monolayers. Consolidation for aluminum would be by "hot molding" in an autoclave or HIP unit at 1120° F.–1140° F. 800 to 1000 psi and 30 minutes, for example. Consolidation for titanium would be by "diffusion bonding" in a hot press or HIP unit at 1650° F.–1750° F. 6000 to 8000 psi and 1 hour, for example. The result is a homogenous structure of the type shown in FIG. 2E where there are no discernible boundaries in the matrix material between the foils 34, the basic structural module 15, and the monolayers 10.

Preferably, the unidirectional monolayers are stacked (often called "layed up") into a desired shape or configuration. The layup or stack has a first aperture defined through the depth of the layup. A preformed ring of modules conforming to the first aperture is placed into the first aperture. The combination of unidirectional monolayers and ring is then consolidated into a unitary structure.

Alternatively, if the cross-sectional diameter of the lug need not be co-extensive with the thickness of the buildup of monolayers, a basic structural module 15 may be interleaved or interposed between monolayers of unidirectional filaments in the way shown in FIG. 3C where the holes within the unidirectional monolayer 10 and the module 15 are extensive and aligned one on top of the other. After consolidation, it is quite clear that the lug will have the greater thickness than the thickness attributed to the buildup of the monolayers.

Clearly, this modular concept can also be used to provide a metal matrix preformed ring within a layup of unidirectional reinforced epoxy matrix material and vice versa.

In summary, the invention is defined by a basic monolayer of a co-winding of filament reinforcements and matrix material in a generally spiral configuration.

Some means such as an acrylic sacrificial bond is used to maintain the spiral intact. A modification of the basic structural module is to cover the basic structural module 15 with a foil constructed from the matrix material. The thickness of the foil, as well as the dimensions of the matrix strip 26 which makes up the co-winding, will determine the relative volume percentage between the reinforcement and the matrix of the composite.

It should be understood that the various modifications of the embodiments disclosed in this detailed description are possible. The foregoing description is provided to enable one skilled in the art to make and use the invention and should not be construed as in any way limiting. Rather, it is intended that the scope of the invention be defined by the following claims.

We claim:

1. A planar filamentary structural module for composites comprising:
   a monolayer of at least one spaced-apart continuous filament wound in a planar spiral about an axis, adjacent filament positions being separated by intended matrix material situated substantially between said continuous filaments.

2. A structural module as defined in claim 1 where adjacent turns of the spiral are attached at least locally to prevent the spiral from unwinding.

3. A structural module as defined in claim 1 where said filament has a tensile strength in excess of 350 thousand psi and/or a tensile module in excess of 30 million psi.

4. A structural module as defined in claim 1 where said filaments are taken from the classes of material consisting of carbon, boron, silicon carbide, silicon nitride, alumina, graphite, or any combination or derivative thereof.

5. A structural module as defined in claim 1 where said spiral is covered with a foil formed from an intended metallic matrix material.

6. A process for producing a spirally-wound planar filamentary structural module for making a composite structure containing continuous filamentary reinforcement distributed within a matrix comprising the steps of:
   abutting matrix material along the length of a filamentary reinforcement;
   winding the combination of filament and matrix material into a planar monolayer spiral configuration so that the matrix material separates the spirally-wound filaments; and
   securing at least locally adjacent turns of said spiral to each other to prevent said spiral form unwinding.

7. A process as defined in claim 6 which includes the additional step of covering said spiral with matrix material.

8. A process as defined in claim 7 which includes the additional step of stacking a plurality of said covered spirals and consolidating them into a unitary composite structure.

9. A process as defined in claim 8 wherein the volume percentage of said filaments and matrix is varied by varying the thickness of said abutting matrix material or said covering matrix material.

10. A process for creating a high-strength filamentary reinforced composite aperture in a composite structure having unidirectional filaments distributed within a matrix comprising the steps of:
    providing a stack of unidirectional filamentary reinforced composite material having a first aperture defined throughout the depth of the stack;
    inserting within the first aperture a conforming ring of composite material having spaced layers of continuous filaments wound in a planar spiral configuration distributed within a matrix material; and
    consolidating the said unidirectional material and said ring into a unitary structure.

11. A process as defined in claim 11 where the unidirectional material and ring have the same metal matrix material and said consolidation is performed by diffusion bonding the ring to the unidirectional material to form a unitary homogeneous structure.

12. A process for making a filamentary reinforced aperture within unidirectional filamentary reinforced material comprising the steps of:
    providing a plurality of layers of unidirectional filamentary reinforced material containing a first aperture;
    interposing between adjacent layers of said unidirectional material a module comprising a layer of a continuous filament wound in a planar spiral ring, said ring having a second aperture which conforms to said first aperture, said first and second apertures being aligned one above the other; and
    consolidating said unidirectional material and said modules into a unitary structure.

* * * * *